(12) United States Patent
Sakuma et al.

(10) Patent No.: US 8,642,210 B2
(45) Date of Patent: Feb. 4, 2014

(54) NEGATIVE ELECTRODE MIXTURE FOR NONAQUEOUS ELECTROLYTE SECONDARY BATTERIES, NEGATIVE ELECTRODE FOR NONAQUEOUS ELECTROLYTE SECONDARY BATTERIES, AND NONAQUEOUS ELECTROLYTE SECONDARY BATTERY

(76) Inventors: Mitsuyasu Sakuma, Tokyo (JP); Ayaka Igarashi, Tokyo (JP); Nobuo Ahiko, Tokyo (JP)

( * ) Notice: Subject to any disclaimer, the term of this patent is extended or adjusted under 35 U.S.C. 154(b) by 273 days.

(21) Appl. No.: 13/120,538

(22) PCT Filed: Aug. 13, 2009

(86) PCT No.: PCT/JP2009/064296
§ 371 (c)(1),
(2), (4) Date: Mar. 23, 2011

(87) PCT Pub. No.: WO2010/035587
PCT Pub. Date: Apr. 1, 2010

(65) Prior Publication Data
US 2011/0177390 A1    Jul. 21, 2011

(30) Foreign Application Priority Data

Sep. 26, 2008  (JP) ................... 2008-248385
Sep. 26, 2008  (JP) ................... 2008-248386

(51) Int. Cl.
*H01M 4/13*    (2010.01)

(52) U.S. Cl.
USPC ......... 429/217; 429/209; 429/212; 252/182.1

(58) Field of Classification Search
USPC ............... 429/217, 209, 212; 252/182.1
See application file for complete search history.

(56) References Cited

U.S. PATENT DOCUMENTS

| | | | |
|---|---|---|---|
| 5,415,958 A | 5/1995 | Takahashi et al. | |
| 5,616,436 A * | 4/1997 | Sonobe et al. | ............ 429/231.8 |
| 6,187,479 B1 * | 2/2001 | Liu | ............... 429/300 |
| 6,200,703 B1 | 3/2001 | Kashio et al. | |
| 2009/0011333 A1 | 1/2009 | Wakita et al. | |

FOREIGN PATENT DOCUMENTS

| | | |
|---|---|---|
| CN | 1710734 A | 12/2005 |
| CN | 1714465 A | 12/2005 |
| JP | 2068855 A | 3/1990 |
| JP | 6172452 A | 6/1994 |
| JP | 7201316 A | 8/1995 |
| JP | 9180725 A | 7/1997 |
| JP | 9320607 A | 12/1997 |
| JP | 10255808 A | 9/1998 |
| JP | 10298386 A | 11/1998 |
| JP | 10306265 A | 11/1998 |
| JP | 2002134113 A | 5/2002 |
| JP | 2002246029 A | 8/2002 |
| JP | 2005310747 A | 11/2005 |
| JP | 2009016245 A | 1/2009 |
| WO | 9850479 A1 | 11/1998 |
| WO | 02073720 A2 | 9/2002 |

* cited by examiner

*Primary Examiner* — Nicholas P D'Aniello
(74) *Attorney, Agent, or Firm* — The Webb Law Firm

(57) ABSTRACT

A negative electrode mixture for nonaqueous electrolyte secondary batteries that can form a mixture layer showing excellent peel strength with a collector in the manufacturing of negative electrodes for nonaqueous electrolyte secondary batteries is provided. The negative electrode mixture for nonaqueous electrolyte secondary batteries includes at least one inorganic substance selected from hydrogen chloride, hydrogen bromide, sulfuric acid and inorganic salts represented by Formula (A) below, an electrode active material, a polar group-containing vinylidene fluoride polymer and an organic solvent, the inorganic substance being contained at 10 to 500 ppm based on 100 wt % of the electrode active material; MX ... (A), wherein M is an alkali metal, and X is Cl or Br.

16 Claims, 1 Drawing Sheet

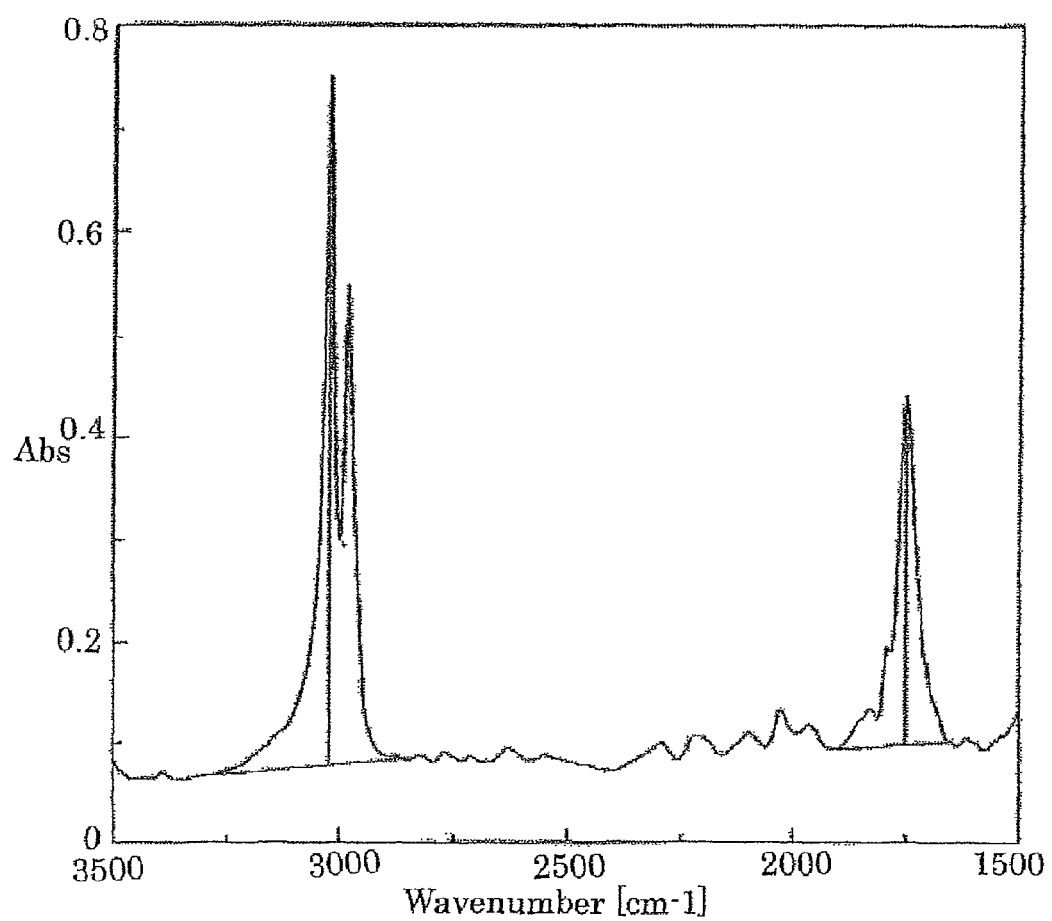

NEGATIVE ELECTRODE MIXTURE FOR NONAQUEOUS ELECTROLYTE SECONDARY BATTERIES, NEGATIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present invention relates to a negative electrode mixture for nonaqueous electrolyte secondary batteries, a negative electrode for nonaqueous electrolyte secondary batteries, and a nonaqueous electrolyte secondary battery.

BACKGROUND ART

The electronic technology has recently made remarkable progress and has been successful in the reduction in size and weight of various devices. Combined with the miniaturization and weight reduction of electronic devices, batteries that supply power to such devices are also required to be smaller and lighter. Nonaqueous electrolyte lithium secondary batteries with small volume and lightweight can supply large amounts of energy, and are used as power sources mainly in small household electronic devices such as cellular phones, personal computers and video camcorders.

Electrodes (positive and negative electrodes) of the nonaqueous electrolyte secondary batteries are prepared by, for example, mixing powdery electrode-forming materials such as electrode active materials and optional conductive auxiliaries with a binder (a binding agent), dissolving or dispersing the mixture in an appropriate solvent, and applying the resultant electrode mixture on collectors followed by drying to form mixture layers.

The binders should be resistant to nonaqueous electrolyte solutions obtained by dissolving electrolytes such as $LiPF_6$ and $LiClO_4$ in nonaqueous solvents such as ethylene carbonate and propylene carbonate. They are also required to have low specific resistance and good membrane-forming properties. In detail, vinylidene fluoride polymers are generally used as binders.

Patent Literature 1 discloses vinylidene fluoride copolymers obtained by copolymerizing vinylidene fluoride with unsaturated dibasic acid monoesters. Patent Literature 1 is directed to the provision of vinylidene fluoride polymers that show good adhesion with substrates such as metals, have excellent chemical resistance and are producible by aqueous polymerization. In the literature, electrode mixtures are described in which the polymers are used as binders for battery electrode production. However, the literature does not specify any particular components other than the polymers that are contained in the electrode mixtures.

Low peel strength in electrodes, in detail between a mixture layer and a collector, has caused problems that the electrodes are cracked or separated during steps such as pressing, slitting and winding. Such problems can lead to low battery performance, and separated pieces can penetrate the separator to cause short circuits. The problems are therefore important items to be controlled in the electrode production.

Patent Literature 2 discloses a process of producing battery electrodes having excellent peel strength between a collector and a mixture layer, wherein an acid is added to a slurry that will be applied to the collector. Patent Literature 2 describes that the acids are preferably organic acids, and more preferably carboxylic acids.

However, the peel strength between the collector and the mixture layer is still insufficient. Further improvements have therefore been required.

Citation List

Patent Literatures

Patent Literature 1: JP-A-H06-172452

Patent Literature 2: JP-A-H02-68855

SUMMARY OF INVENTION

Technical Problem

The present invention has been made in view of the problems in the art as described above. It is therefore an object of the invention to provide a negative electrode mixture for nonaqueous electrolyte secondary batteries that can form a mixture layer showing excellent peel strength with a collector in the manufacturing of negative electrodes for nonaqueous electrolyte secondary batteries, and to provide a negative electrode for nonaqueous electrolyte secondary batteries that is obtainable by applying the mixture on a collector followed by drying, and a nonaqueous electrolyte secondary battery having the negative electrode.

Solution to Problem

The present inventors studied diligently to solve the problems described hereinabove. They have then found that a negative electrode mixture for nonaqueous electrolyte secondary batteries which contains a specific polymer and a specific inorganic substance can give a negative electrode for nonaqueous electrolyte secondary batteries in which a layer of the mixture has excellent peel strength with a collector. The present invention has been completed based on the finding.

A negative electrode mixture for nonaqueous electrolyte secondary batteries according to the invention comprises at least one inorganic substance selected from the group consisting of hydrogen chloride, hydrogen bromide, sulfuric acid and inorganic salts represented by Formula (A) below, an electrode active material, a polar group-containing vinylidene fluoride polymer and an organic solvent, the inorganic substance being contained at 10 to 500 ppm based on 100 wt % of the electrode active material;

$$MX \ldots (A)$$

wherein M is an alkali metal, and X is Cl or Br.

The inorganic substance is preferably an inorganic salt represented by Formula (A).

The inorganic substance is preferably at least one inorganic acid selected from the group consisting of hydrogen chloride, hydrogen bromide and sulfuric acid.

The inorganic salt is preferably at least one selected from the group consisting of potassium chloride and lithium chloride.

The polar group-containing vinylidene fluoride polymer is preferably a vinylidene fluoride copolymer obtained by copolymerizing 80 to 99.9 parts by weight of vinylidene fluoride and 0.1 to 20 parts by weight of a polar group-containing monomer (wherein the total of the vinylidene fluoride and the polar group-containing monomer is 100 parts by weight).

The polar group-containing vinylidene fluoride polymer is preferably a vinylidene fluoride polymer which has at least one polar group selected from the group consisting of carboxyl groups and carboxylic acid anhydride groups.

When the polar group-containing vinylidene fluoride polymer is a vinylidene fluoride polymer which has at least one polar group selected from the group consisting of carboxyl groups and carboxylic acid anhydride groups, the polar group-containing vinylidene fluoride polymer preferably has an infrared absorption spectrum in which the absorbance ratio ($I_R$) represented by Formula (1) below is in the range of 0.1 to 1.5;

$$I_R = I_{1750}/I_{3025} \tag{1}$$

wherein $I_{1750}$ is the absorbance at 1750 cm$^{-1}$ and $I_{3025}$ is the absorbance at 3025 cm$^{-1}$.

The electrode active material is preferably a carbon material.

A negative electrode for nonaqueous electrolyte secondary batteries according to the invention is obtainable by applying the negative electrode mixture for nonaqueous electrolyte secondary batteries on a collector and drying the mixture.

The collector is preferably a copper foil.

A nonaqueous electrolyte secondary battery according to the invention comprises the negative electrode for nonaqueous electrolyte secondary batteries.

Advantageous Effects of Invention

The negative electrodes for nonaqueous electrolyte secondary batteries produced with the negative electrode mixtures of the invention have excellent peel strength between the mixture layer and the collector.

BRIEF DESCRIPTION OF DRAWING

The drawing depicts an IR spectrum of a polar group-containing vinylidene fluoride polymer (2).

DESCRIPTION OF EMBODIMENTS

The present invention will be described in detail below.

A negative electrode mixture for nonaqueous electrolyte secondary batteries according to the invention contains at least one inorganic substance selected from the group consisting of hydrogen chloride, hydrogen bromide, sulfuric acid and inorganic salts represented by Formula (A) below, an electrode active material, a polar group-containing vinylidene fluoride polymer and an organic solvent. The content of the inorganic substance is 10 to 500 ppm based on 100 wt % of the electrode active material.

$$MX \ldots (A)$$

In Formula (A), M is an alkali metal, and X is Cl or Br.

[Electrode Active Materials]

The negative electrode mixture for nonaqueous electrolyte secondary batteries contains an electrode active material. The electrode active materials are not particularly limited, and known electrode active materials for negative electrodes may be used. Specific examples include carbon materials, metal and alloy materials, and metal oxides, with the carbon materials being preferred.

Examples of the carbon materials include synthetic graphites, natural graphites, non-graphitizable carbon and graphitizable carbon. The carbon materials maybe used singly, or two or more kinds may be used in combination.

The use of these carbon materials leads to high energy density of the obtainable batteries.

For example, the synthetic graphites may be obtained by carbonizing organic materials and heat treating the carbon products at higher temperatures, followed by crushing and classification. MAG series (manufactured by Hitachi Chemical Co., Ltd.) and MCMB (manufactured by OSAKA GAS CO., LTD.) may be used as the synthetic graphites.

[Polar Group-containing Vinylidene Fluoride Polymers]

The negative electrode mixture for nonaqueous electrolyte secondary batteries contains a polar group-containing vinylidene fluoride polymer as a binder resin. In the invention, the polar group-containing vinylidene fluoride polymers are polymers that contain a polar group and are obtained from at least vinylidene fluoride as a monomer. In a usual embodiment, the polar group-containing vinylidene fluoride polymers are obtained from vinylidene fluoride and a monomer having a polar group. Other monomers may be optionally used. In the invention, monomers having a polar group in the molecule are also referred to as the polar group-containing monomers.

In the invention, the polar groups refer to atomic groups that contain an atom with higher electronegativity than carbon, such as nitrogen, oxygen and sulfur. That is, single atoms such as fluorine and chlorine are not the polar groups in the present invention.

Examples of the polar groups in the polar group-containing vinylidene fluoride polymers include carboxyl groups, epoxy groups, hydroxyl groups, sulfonic acid groups, carboxylic acid anhydride groups and amino groups, with the carboxyl groups and the carboxylic acid anhydride groups being preferred. The polar group-containing vinylidene fluoride polymers contain at least one and may contain two or more of these polar groups. From the viewpoints of adhesion and availability, preferred polar group-containing vinylidene fluoride polymers are those that contain at least one polar group selected from the carboxyl groups and the carboxylic acid anhydride groups.

The polar group-containing vinylidene fluoride polymers may be used singly, or two or more kinds may be used in combination.

When the polar group contained in the polar group-containing vinylidene fluoride polymers is at least one selected from the carboxyl groups and the carboxylic acid anhydride groups, the polar group-containing vinylidene fluoride polymer usually contains vinylidene fluoride-derived structural units in an amount of not less than 80 parts by weight, and preferably not less than 85 parts by weight based on 100 parts by weight of the polymer.

The polar group-containing vinylidene fluoride polymers may be generally produced by the following processes: (1) Vinylidene fluoride, a polar group-containing monomer and optionally other monomer are copolymerized (hereinafter, also the process (1)). (2) Vinylidene fluoride is polymerized or copolymerized with other monomer to give a vinylidene fluoride polymer. A polar group-containing monomer is polymerized or copolymerized with other monomer to give a polar group-containing polymer. The polar group-containing polymer is grafted to the vinylidene fluoride polymer. (The process will be also referred to as the process (2).) (3) Vinylidene fluoride is polymerized or copolymerized with other monomer to give a vinylidene fluoride polymer. The vinylidene fluoride polymer is modified with a polar group-containing monomer such as maleic acid or maleic acid anhydride. (The process will be also referred to as the process (3).)

The polar group-containing vinylidene fluoride polymers used in the invention contain the polar groups and thereby achieve improved adhesion with collectors compared with polyvinylidene fluorides having no polar groups. Further, the polar group-containing vinylidene fluoride polymers have chemical resistance comparable to that of polyvinylidene fluorides having no polar groups.

Of the processes (1) to (3) for the production of the polar group-containing vinylidene fluoride polymers, the process (1) is preferable from the viewpoints of the number of steps and production costs.

The polar group-containing vinylidene fluoride polymers may be vinylidene fluoride copolymers that are obtained by copolymerizing 80 to 99.9 parts by weight of vinylidene fluoride and 0.1 to 20 parts by weight of a polar group-containing monomer (wherein the total of the vinylidene fluoride and the polar group-containing monomer is 100 parts by weight). Alternatively, the polar group-containing vinylidene fluoride polymers may be obtained by copolymerization of vinylidene fluoride, a polar group-containing monomer and other monomer. When other monomers are used, they may be usually used in amounts of 0.1 to 20 parts by weight based on 100 parts by weight of the vinylidene fluoride and the polar group-containing monomer combined.

For the production of vinylidene fluoride polymers which have at least one polar group selected from the carboxyl groups and the carboxylic acid anhydride groups, at least one monomer selected from carboxyl group-containing monomers and carboxylic acid anhydride group-containing monomers is usually used as the polar group-containing monomer.

When at least one monomer selected from carboxyl group-containing monomers and carboxylic acid anhydride group-containing monomers is used, the polar group-containing vinylidene fluoride polymer is preferably a vinylidene fluoride copolymer obtained by copolymerizing 90 to 99.9 parts by weight of vinylidene fluoride and 0.1 to 10 parts by weight of at least one monomer selected from carboxyl group-containing monomers and carboxylic acid anhydride group-containing monomers (wherein the total of the vinylidene fluoride and the at least one monomer selected from carboxyl group-containing monomers and carboxylic acid anhydride group-containing monomers is 100 parts by weight), and is more preferably a vinylidene fluoride copolymer obtained by copolymerizing 95 to 99.9 parts by weight of vinylidene fluoride and 0.1 to 5 parts by weight of at least one monomer selected from carboxyl group-containing monomers and carboxylic acid anhydride group-containing monomers (wherein the total of the vinylidene fluoride and the at least one monomer selected from carboxyl group-containing monomers and carboxylic acid anhydride group-containing monomers is 100 parts by weight).

Preferred examples of the carboxyl group-containing monomers include unsaturated monobasic acids, unsaturated dibasic acids, and monoesters of unsaturated dibasic acids. Unsaturated dibasic acids and monoesters of unsaturated dibasic acids are more preferable.

Examples of the unsaturated monobasic acids include acrylic acid. Examples of the unsaturated dibasic acids include maleic acid and citraconic acid. The monoesters of unsaturated dibasic acids are preferably of 5 to 8 carbon atoms, with examples including monomethyl maleate, monoethylmaleate, monomethyl citraconate and monoethyl citraconate.

In particular, preferred carboxyl group-containing monomers are maleic acid, citraconic acid, monomethyl maleate and monomethyl citraconate.

Examples of the carboxylic acid anhydride group-containing monomers include anhydrides of unsaturated dibasic acids. The anhydrides of unsaturated dibasic acids include maleic acid anhydride and citraconic acid anhydride.

The polar group-containing vinylidene fluoride polymers used in the invention usually have polar groups that are derived from the polar group-containing monomers. For example, when the polar group-containing monomer is a carboxyl group-containing monomer, the obtainable polar group-containing vinylidene fluoride polymer is a carboxyl group-containing vinylidene fluoride polymer. When the polar group-containing monomer is a carboxylic acid anhydride group-containing monomer, the obtainable polar group-containing vinylidene fluoride polymer may have the carboxylic acid anhydride group or a carboxyl group resulting from the hydrolysis of the carboxylic acid anhydride group.

Monomers other than the vinylidene fluoride and the polar group-containing monomers may be used in the invention. Examples of such other monomers include fluorine-containing monomers copolymerizable with the vinylidene fluoride, and hydrocarbon monomers such as ethylene and propylene. The fluorine-containing monomers copolymerizable with the vinylidene fluoride include vinyl fluoride, trifluoroethylene, trifluorochloroethylene, tetrafluoroethylene and hexafluoropropylene.

The other monomers may be used singly, or two or more kinds may be used in combination.

The process (1) may be performed by polymerization methods such as suspension polymerization, emulsion polymerization and solution polymerization. From the viewpoint of easy after treatment, aqueous suspension polymerization and emulsion polymerization are preferable, and aqueous suspension polymerization is particularly preferable.

In suspension polymerization using water as a dispersion medium, suspending agents may be used in an amount of 0.005 to 1.0 part by weight, and preferably 0.01 to 0.4 part by weight based on 100 parts by weight of all the monomers to be copolymerized (the vinylidene fluoride, the polar group-containing monomer and optionally other monomers). Examples of the suspending agents include methyl cellulose, methoxymethyl cellulose, propoxymethyl cellulose, hydroxyethyl cellulose, hydroxypropyl cellulose, polyvinyl alcohol, polyethylene oxide and gelatin.

Polymerization initiators may be used, with examples including diisopropyl peroxydicarbonate, di-normal propyl peroxydicarbonate, di-normal heptafluoropropyl peroxydicarbonate, diisopropyl peroxydicarbonate, isobutyryl peroxide, di(chlorofluoroacyl) peroxide and di(perfluoroacyl) peroxide. The usage amount thereof is 0.1 to 5 parts by weight, and preferably 0.3 to 2 parts by weight based on 100 parts by weight of all the monomers to be copolymerized (the vinylidene fluoride, the polar group-containing monomer and optionally other monomers).

The polymerization degree of the polar group-containing vinylidene fluoride polymers may be controlled by adding chain transfer agents such as ethyl acetate, methyl acetate, diethyl carbonate, acetone, ethanol, n-propanol, acetaldehyde, propylaldehyde, ethyl propionate and carbon tetrachloride. The usage amount thereof is 0.1 to 5 parts by weight, and preferably 0.5 to 3 parts by weight based on 100 parts by weight of all the monomers to be copolymerized.

The monomers (the vinylidene fluoride, the polar group-containing monomer and optionally other monomers) are fed to the copolymerization in a monomers:water weight ratio of 1:1 to 1:10, and preferably 1:2 to 1:5. The polymerization temperature may be 10 to 80° C., and the polymerization time may range from 10 to 100 hours. The polymerization pressure is generally an increased pressure, and preferably 2.0 to 8.0 MPa-G.

The vinylidene fluoride, the polar group-containing monomer and optionally other monomers may be easily copolymerized by aqueous suspension polymerization under the above conditions, resulting in the polar group-containing vinylidene fluoride polymer for use in the invention.

Alternatively, the polar group-containing vinylidene fluoride polymers maybe produced by the process (2) as follows.

In the process (2) for producing the polar group-containing vinylidene fluoride polymers, vinylidene fluoride is polymerized or copolymerized with other monomer to give a vinylidene fluoride polymer. This polymerization or copolymerization may be generally performed by suspension polymerization or emulsion polymerization. Separately from the vinylidene fluoride polymer, a polar group-containing monomer is polymerized or copolymerized with other monomer to give a polar group-containing polymer. This polymerization for the polar group-containing polymer may be generally performed by emulsion polymerization or suspension polymerization. The vinylidene fluoride polymer and the polar group-containing polymer are then reacted together so that the polar group-containing polymer is grafted to the vinylidene fluoride polymer, resulting in the polar group-containing vinylidene fluoride polymer. The grafting may be accomplished by the use of a peroxide or a radiation. In a preferred embodiment, a mixture of the vinylidene fluoride polymer and the polar group-containing polymer is heat treated in the presence of a peroxide.

The polar group-containing vinylidene fluoride polymers used in the invention preferably have an inherent viscosity in the range of 0.5 to 5.0 dl/g, and more preferably 1.1 to 4.0 dl/g. (The inherent viscosity herein refers to logarithmic viscosity at 30° C. of a solution of 4 g of the resin in 1 L of N,N-dimethylformamide. The same applies hereinafter.) The polymers having this viscosity may be suitably used in negative electrode mixtures for nonaqueous electrolyte secondary batteries.

The inherent viscosity may be calculated from the following equation based on data obtained by analyzing a solution of 80 mg of the polar group-containing vinylidene fluoride polymer in 20 ml of N,N-dimethylformamide, with an Ubbelohde viscometer in a thermostatic chamber at 30° C.

$$\eta_i = (1/C) \cdot ln(\eta/\eta_0)$$

wherein $\eta$ is the viscosity of the polymer solution, $\eta_0$ is the viscosity of the N,N-dimethylformamide solvent, and C is 0.4 g/dl.

The polar group-containing vinylidene fluoride polymers usually have a weight average molecular weight according to GPC (gel permeation chromatography) in the range of 50,000 to 1,500,000.

When the polar group-containing vinylidene fluoride polymer contains at least one polar group selected from the carboxyl groups and the carboxylic acid anhydride groups, a hot pressed film of the polymer preferably has an infrared absorption spectrum in which the absorbance ratio ($I_R$) represented by Formula (1) below is in the range of 0.1 to 1.5.

$$I_R = I_{1750}/I_{3025}$$

In Formula (1), $I_{1750}$ is the absorbance at 1750 cm$^{-1}$ and $I_{3025}$ is the absorbance at 3025 cm$^{-1}$.

In infrared absorption spectra, the carbonyl group shows an absorption band from 1650 to 1800 cm$^{-1}$.

Accordingly, $I_{1750}$ in Formula (1) is assigned to the carbonyl group, and $I_{3025}$ is ascribed to the C—H structures. Thus, $I_R$ can be an indicator of the amount of the carbonyl groups in the polar group-containing vinylidene fluoride polymer.

[Inorganic Substances]

The negative electrode mixture for nonaqueous electrolyte secondary batteries contains at least one inorganic substance selected from the group consisting of hydrogen chloride, hydrogen bromide, sulfuric acid and inorganic salts represented by Formula (A) below:

$$MX \ldots (A)$$

In Formula (A), M is an alkali metal, and X is Cl or Br.

The inorganic substance is preferably an inorganic salt represented by Formula (A), or is preferably at least one inorganic acid selected from hydrogen chloride, hydrogen bromide and sulfuric acid.

In the invention, the at least one inorganic substance selected from hydrogen chloride, hydrogen bromide, sulfuric acid and the inorganic salts of Formula (A) will also be simply referred to as the inorganic substance. The inorganic substances may be used singly, or two or more kinds may be used in combination.

In the invention, the inorganic salts represented by Formula (A) will also be simply referred to as the inorganic salts. The inorganic salts are not particularly limited as long as they have Formula (A). Specific examples include lithium chloride, potassium chloride, lithium bromide and potassium bromide, with lithium chloride and potassium chloride being preferable in terms of production costs and handling. The inorganic salts may be used singly, or two or more kinds may be used in combination.

In the invention, the at least one inorganic acid selected from hydrogen chloride, hydrogen bromide and sulfuric acid will also be simply referred to as the inorganic acid. Of the inorganic acids, hydrogen chloride is preferable because it can be easily removed by heating in the manufacturing of nonaqueous electrolyte secondary battery negative electrodes by the application and subsequent drying of the negative electrode mixtures on collectors. The inorganic acids may be used singly, or two or more kinds may be used in combination.

When the inorganic salt is used as the inorganic substance in the production of the negative electrode mixtures for nonaqueous electrolyte secondary batteries, the inorganic salt may be used in the form of powder or solution in a solvent. When hydrogen chloride or hydrogen bromide is used as the inorganic substance in the production of the negative electrode mixtures for nonaqueous electrolyte secondary batteries, it is preferable from the viewpoint of handling that the hydrogen chloride or hydrogen bromide be used as an aqueous solution, namely as hydrochloric acid or hydrobromic acid. Similarly, sulfuric acid may be used as an aqueous solution.

In the negative electrode mixtures for nonaqueous electrolyte secondary batteries according to the invention, the inorganic substance is present at 10 to 500 ppm, preferably 20 to 400 ppm, and more preferably 50 to 300 ppm based on 100 wt % of the electrode active material.

The negative electrode mixtures for nonaqueous electrolyte secondary batteries of the invention contain the inorganic substance in the above amount. The use of the negative electrode mixtures in the production of nonaqueous electrolyte secondary battery negative electrodes leads to negative electrodes in which the mixture layer achieves excellent peel strength with collectors. The reasons for the high peel strength are not clear, but the present inventors assume that the inorganic substance reacts with the surface of collectors, and the reaction sites interact with the polar groups of the polar group-containing vinylidene fluoride polymer to provide excellent peel strength.

With the use of the negative electrode mixtures for nonaqueous electrolyte secondary batteries, nonaqueous electrolyte secondary battery negative electrodes may be produced in which the mixture layer shows improved peel strength with collectors. The negative electrode mixtures for nonaqueous electrolyte secondary batteries of the invention can thus solve the electrode cracking or separation problems which have been encountered in the battery manufacturing with conventional negative electrode mixtures.

[Organic Solvents]

The negative electrode mixture for nonaqueous electrolyte secondary batteries of the invention contains an organic solvent. The organic solvents used in the invention are capable of dissolving the polar group-containing vinylidene fluoride polymers. Polar solvents may be suitably used. Specific examples of the organic solvents include N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate and trimethyl phosphate. N-methyl-2-pyrrolidone, N,N-dimethylformamide, N,N-dimethylacetamide and dimethylsulfoxide are preferred. The organic solvents may be used singly, or two or more kinds may be used in combination.

The negative electrode mixtures for nonaqueous electrolyte secondary batteries of the invention contain the inorganic substance, the electrode active material, the polar group-containing vinylidene fluoride polymer and the organic solvent as described above.

The contents of the components in the negative electrode mixtures for nonaqueous electrolyte secondary batteries, based on 100 wt % of the electrode active material, are generally:

1.0 to 25 wt % for the polar group-containing vinylidene fluoride polymer and 20 to 300 wt % for the organic solvent, and preferably 2.0 to 13 wt % for the polar group-containing vinylidene fluoride polymer and 70 to 200 wt % for the organic solvent.

The negative electrode mixtures for nonaqueous electrolyte secondary batteries that contain the components in the above amounts can make nonaqueous electrolyte secondary battery negative electrodes in which the mixture layer has higher peel strength with collectors. Further, such mixtures for nonaqueous electrolyte secondary batteries show excellent application properties when applied to collectors in the production of nonaqueous electrolyte secondary battery negative electrodes.

The negative electrode mixtures for nonaqueous electrolyte secondary batteries may contain additional components other than the inorganic substances, the electrode active materials, the polar group-containing vinylidene fluoride polymers and the organic solvents. When hydrogen chloride or hydrogen bromide is used as the inorganic substance, they are usually used as aqueous solutions, namely hydrochloric acid or hydrobromic acid. In such cases, therefore, water is usually present as an additional component in the negative electrode mixtures for nonaqueous electrolyte secondary batteries. Other examples of the additional components are conductive auxiliaries such as carbon blacks and pigment dispersants such as polyvinylpyrrolidone.

The negative electrode mixtures for nonaqueous electrolyte secondary batteries usually have a viscosity of 2000 to 50000 mPa·s, and preferably 5000 to 30000 mPa·s as measured at 25° C. and $2\ s^{-1}$ shear rate with an E-type viscometer.

The negative electrode mixtures for nonaqueous electrolyte secondary batteries may be produced by mixing the inorganic substance, the electrode active material, the polar group-containing vinylidene fluoride polymer and the organic solvent to a uniform slurry. The addition sequence in the mixing is not particularly limited.

When a powdery inorganic salt is used as the inorganic substance, the polar group-containing vinylidene fluoride polymer and the inorganic salt may be mixed with part of the organic solvent to give a binder solution, and the electrode active material and the remaining part of the organic solvent may be added to the binder, followed by stirring and mixing. Alternatively, the polar group-containing vinylidene fluoride polymer may be mixed with part of the organic solvent to give a binder solution, and the electrode active material and a solution of the inorganic salt in the remaining part of the organic solvent maybe added to the binder, followed by stirring and mixing.

When an aqueous solution of the inorganic acid such as hydrogen chloride is used as the inorganic substance, a process (a) may be adopted in which the polar group-containing vinylidene fluoride polymer is mixed with part of the organic solvent to give a binder solution, the aqueous inorganic acid solution is mixed with the remaining part of the organic solvent to give a mixture liquid, and the electrode active material, the mixture liquid and optionally an organic solvent as an electrode mixture viscosity controller are added to the binder solution, followed by stirring and mixing. Alternatively, a process (b) may be used in which the aqueous inorganic acid solution is mixed with the organic solvent to give a mixture liquid, the polar group-containing vinylidene fluoride polymer is added to the mixture liquid to give a binder solution, and the electrode active material and optionally an organic solvent as an electrode mixture viscosity controller are added to the binder solution, followed by stirring and mixing.

[Negative Electrodes for Nonaqueous Electrolyte Secondary Batteries]

A negative electrode for nonaqueous electrolyte secondary batteries according to the invention is obtainable by applying the aforementioned negative electrode mixture for nonaqueous electrolyte secondary batteries to a collector followed by drying. The negative electrodes thus have a collector and a layer formed from the negative electrode mixture for nonaqueous electrolyte secondary batteries.

In the invention, the term mixture layer refers to a layer formed by applying the negative electrode mixture for nonaqueous electrolyte secondary batteries to a collector followed by drying.

An exemplary collector for use in the invention is copper, for example in the shape of metal foil or metal screen. A preferred collector is a copper foil.

The thickness of the collectors is usually 5 to 100 µm, and preferably 5 to 20 µm.

In the production of the negative electrodes for nonaqueous electrolyte secondary batteries, the negative electrode mixture is applied to at least one surface, preferably both surfaces of the collectors. The application methods are not particularly limited. Exemplary methods are bar coating, die coating and comma coating.

The drying after the application is usually performed at temperatures of 50 to 150° C. for 1 to 300 minutes. The pressure in the drying is not particularly limited, but is usually atmospheric pressure or reduced pressure.

The negative electrodes for nonaqueous electrolyte secondary batteries of the invention may be manufactured as described above. The multilayer structure of the nonaqueous electrolyte secondary battery negative electrodes is a two-layer structure, i.e., mixture layer/collector, when the negative electrode mixture is applied to one surface of the collector; and is a three-layer structure, i.e., mixture layer/collector/mixture layer, when the negative electrode mixture is applied to both surfaces of the collector.

The negative electrodes for nonaqueous electrolyte secondary batteries achieve excellent peel strength between the collector and the mixture layer as a result of the use of the negative electrode mixtures of the invention. Consequently, the negative electrodes of the invention show high resistance to cracking or separation during steps such as pressing, slitting and winding, thus leading to improved productivity.

The negative electrodes for nonaqueous electrolyte secondary batteries of the invention have excellent peel strength between the collector and the mixture layer as described above. In detail, the peel strength between the collector and the mixture layer is usually 0.5 to 20 gf/mm, and preferably 1 to 18 gf/mm as measured by a 180° peel test in accordance with JIS K6854.

[Nonaqueous Electrolyte Secondary Batteries]

A nonaqueous electrolyte secondary battery according to the invention has the aforementioned negative electrode for nonaqueous electrolyte secondary batteries.

The nonaqueous electrolyte secondary batteries are not particularly limited as long as having the nonaqueous electrolyte secondary battery negative electrodes of the invention. Members other than the negative electrodes, for example positive electrodes and separators, may be conventional.

EXAMPLES

The present invention will be described in detail by presenting examples hereinbelow without limiting the scope of the invention.

[Production of Polar Group-containing Vinylidene Fluoride Polymer (1)]

A 2 liter volume autoclave was charged with 1040 g of ion exchange water, 0.6 g of methyl cellulose, 1.76 g of diisopropyl peroxydicarbonate, 388 g of vinylidene fluoride, 12 g of hexafluoropropylene and 4 g of monomethyl maleate. Suspension polymerization was carried out at 29° C. for 39 hours. The maximum pressure reached during the polymerization was 3.9 MPa. After the completion of the polymerization, the polymer slurry was dehydrated, washed with water and dried at 80° C. for 20 hours, thereby obtaining a powdery polar group-containing vinylidene fluoride polymer (1) having a carboxyl group as the polar group.

The polymerization yield was 90 wt %. The polar group-containing vinylidene fluoride polymer (1) had an inherent viscosity of 3.1 dl/g.

[Production of Polar Group-containing Vinylidene Fluoride Polymer (2)]

A 2 liter volume autoclave was charged with 1040 g of ion exchange water, 0.8 g of methyl cellulose, 2.5 g of ethyl acetate, 4 g of diisopropyl peroxydicarbonate, 396 g of vinylidene fluoride and 4 g of monomethyl maleate. Suspension polymerization was carried out at 29° C. for 30 hours. The maximum pressure reached during the polymerization was 4.2 MPa. After the completion of the polymerization, the polymer slurry was dehydrated, washed with water and dried at 80° C. for 20 hours, thereby obtaining a powdery polar group-containing vinylidene fluoride polymer (2) having a carboxyl group as the polar group.

The polymerization yield was 90 wt %. The polar group-containing vinylidene fluoride polymer (2) had an inherent viscosity of 1.1 dl/g.

[Production of Polar Group-containing Vinylidene Fluoride Polymer (3)]

A 2 liter volume autoclave was charged with 1024 g of ion exchange water, 0.6 g of methyl cellulose, 1.2 g of ethyl acetate, 4.3 g of diisopropyl peroxydicarbonate, 380 g of vinylidene fluoride and 20 g of maleic acid. Suspension polymerization was carried out at 29° C. for 20 hours. The maximum pressure reached during the polymerization was 4.3 MPa. After the completion of the polymerization, the polymer slurry was dehydrated, washed with water and dried at 80° C. for 20 hours, thereby obtaining a powdery polar group-containing vinylidene fluoride polymer (3) having a carboxyl group as the polar group.

The polymerization yield was 77 wt %. The polar group-containing vinylidene fluoride polymer (3) had an inherent viscosity of 1.3 dl/g.

[Production of Polyvinylidene Fluoride]

A 2 liter volume autoclave was charged with 1040 g of ion exchange water, 0.2 g of methyl cellulose, 6.0 g of ethyl acetate, 4.8 g of di-normal propyl peroxydicarbonate and 400 g of vinylidene fluoride. Suspension polymerization was carried out at 26° C. for 12 hours. The maximum pressure reached during the polymerization was 4.0 MPa. After the completion of the polymerization, the polymer slurry was dehydrated, washed with water and dried at 80° C. for 20 hours, thereby obtaining a powdery polyvinylidene fluoride.

The polymerization yield was 90 wt %. The polyvinylidene fluoride had an inherent viscosity of 1.1 dl/g.

[Absorbance Ratio ($I_R$)]

IR spectra of the polar group-containing vinylidene fluoride polymers and the polyvinylidene fluoride were recorded by the following method.

The powdery polar group-containing vinylidene fluoride polymers and the powdery polyvinylidene fluoride were each hot pressed at 200° C. to prepare 30 mm×30 mm pressed sheets.

The pressed sheets were analyzed with infrared spectrophotometer FT-IR 4100 (manufactured by JASCO Corporation) to obtain IR spectra in the range of 1500 $cm^{-1}$ to 3500 $cm^{-1}$.

From the IR spectra, the absorbance ratio ($I_R$) represented by Formula (1) below was obtained.

$$I_R = I_{1750}/I_{3025} \tag{1}$$

In Formula (1), $I_{1750}$ is the absorbance at 1750 $cm^{-1}$ and $I_{3025}$ is the absorbance at 3025 $cm^{-1}$.

$I_{1750}$ and $I_{3025}$ are obtainable by subtracting the background absorbance from the apparent absorbance at the above wavenumbers. That is, $I_{1750}=I_{20}-I_{21}$ wherein $I_{20}$ is the apparent absorbance at wavenumber 1750 $cm^{-1}$ and $I_{21}$ is the background absorbance at the same wavenumber as $I_{20}$.

Similarly, $I_{3025}=I_{10}-I_{11}$ wherein $I_{10}$ is the apparent absorbance at wavenumber 3025 $cm^{-1}$ and $I_{11}$ is the background absorbance at the same wavenumber as $I_{10}$.

The background absorbance is read at the baseline extending between the tails of the peak on the lower wavenumber side and the higher wavenumber side. In detail, $I_{21}$ is the absorbance at 1750 $cm^{-1}$ that is read at the baseline connecting the tails of the absorption peak on the lower wavenumber side (1653 $cm^{-1}$ to 1662 $cm^{-1}$) and the higher wavenumber side (1897 $cm^{-1}$ to 1907 $cm^{-1}$). Similarly, $I_{11}$ is the absorbance at 3025 $cm^{-1}$ that is read at the baseline connecting the tails of the absorption peak on the lower wavenumber side (2859 $cm^{-1}$ to 2866 $cm^{-1}$) and the higher wavenumber side (3306 $cm^{-1}$ to 3317 $cm^{-1}$).

In more detail, the absorbance ratio ($I_R$) of the polar group-containing vinylidene fluoride polymer (2) can be determined from the IR spectrum (FIG. 1) in the following manner.

From FIG. 1, the apparent absorbance $I_{20}$ at wavenumber 1750 $cm^{-1}$ is 0.43, and the absorbance $I_{21}$ at wavenumber 1750 $cm^{-1}$ that is read at the baseline connecting the tails at 1658 $cm^{-1}$ and 1905 $cm^{-1}$ is 0.09. Accordingly, $I_{20}-I_{21}=I_{1750}=0.34$. Similarly, the apparent absorbance $I_{10}$ at wavenumber 3025 $cm^{-1}$ is 0.76, and the absorbance $I_{11}$ at wavenumber 3025 cm$^{-1}$ that is read at the baseline connecting the tails at 2863 cm$^{-1}$ and 3313 cm$^{-1}$ is 0.08. Accordingly, $I_{10}-I_{11}=I_{3025}=0.68$.

Thus, the absorbance ratio ($I_R$) of the polar group-containing vinylidene fluoride polymer (2) was 0.50.

The absorbance ratio ($I_R$) of the polar group-containing vinylidene fluoride polymer (1) was similarly determined. The absorbance ratio ($I_R$) of the polar group-containing vinylidene fluoride polymer (1) was 0.15.

The absorbance ratio ($I_R$) of the polar group-containing vinylidene fluoride polymer (3) was similarly determined. The absorbance ratio ($I_R$) of the polar group-containing vinylidene fluoride polymer (3) was 0.13.

The absorbance ratio ($I_R$) of the polyvinylidene fluoride was similarly determined. The absorbance ratio ($I_R$) of the polyvinylidene fluoride was 0.07.

Example A1

0.005 g of lithium chloride and 5 g of the polar group-containing vinylidene fluoride polymer (1) were homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together with THINKY MIXER (manufactured by THINKY CORPORATION) to give a negative electrode mixture (A1) for nonaqueous electrolyte secondary batteries.

The negative electrode mixture (A1) for nonaqueous electrolyte secondary batteries was uniformly bar coated on a 10 μm thick rolled copper foil as a collector such that the dry weight of the obtainable mixture layer would be 150 g/m$^2$. The mixture was then dried in a gear oven at 110° C. and was heat treated at 130° C., followed by pressing at 40 MPa. An electrode (A1) was thus produced in which the mixture layer had a bulk density of 1.7 g/cm$^3$.

Example A2

0.010 g of lithium chloride and 5 g of the polar group-containing vinylidene fluoride polymer (1) were homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together to give a negative electrode mixture (A2) for nonaqueous electrolyte secondary batteries.

An electrode (A2) was produced in the same manner as in Example A1, except that the negative electrode mixture (A2) was used.

Example A3

0.005 g of potassium chloride and 5 g of the polar group-containing vinylidene fluoride polymer (1) were homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together to give a negative electrode mixture (A3) for nonaqueous electrolyte secondary batteries.

An electrode (A3) was produced in the same manner as in Example A1, except that the negative electrode mixture (A3) was used.

Example A4

0.005 g of potassium bromide and 5 g of the polar group-containing vinylidene fluoride polymer (1) were homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together to give a negative electrode mixture (A4) for nonaqueous electrolyte secondary batteries.

An electrode (A4) was produced in the same manner as in Example A1, except that the negative electrode mixture (A4) was used.

Example A5

0.010 g of potassium chloride and 10 g of the polar group-containing vinylidene fluoride polymer (2) were homogeneously dissolved in 90 g of N-methyl-2-pyrrolidone to give a binder solution.

To 10 g of the binder solution, 9.0 g of MAG (synthetic graphite manufactured by Hitachi Chemical Co., Ltd., average particle diameter: 20 μm) and 3.22 g of diluent N-methyl-2-pyrrolidone were added. The mixture was stirred and mixed together to give a negative electrode mixture (A5) for nonaqueous electrolyte secondary batteries.

The viscosity of the negative electrode mixture (A5) for nonaqueous electrolyte secondary batteries was measured with an E-type viscometer at 25° C. and 2 s$^{-1}$ shear rate, resulting in 8000 mPa·s.

An electrode (A5) was produced in the same manner as in Example A1, except that the negative electrode mixture (A5) was used.

Comparative Example A1

5 g of the polar group-containing vinylidene fluoride polymer (1) was homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together to give a negative electrode mixture (cA1) for nonaqueous electrolyte secondary batteries.

An electrode (cA1) was produced in the same manner as in Example A1, except that the negative electrode mixture (cA1) was used.

Comparative Example A2

0.075 g of lithium chloride and 5 g of the polar group-containing vinylidene fluoride polymer (1) were homogeneously dissolved in 95 g of N-methyl-2-pyrrolidone to give a binder solution.

To 12 g of the binder solution, 9.4 g of MAG (synthetic graphite manufactured by Hitachi Chemical Co., Ltd., average particle diameter: 20 μm) and 2.81 g of diluent N-methyl-2-pyrrolidone were added. The mixture was stirred and mixed together to give a negative electrode mixture (cA2) for nonaqueous electrolyte secondary batteries.

An electrode (cA2) was produced in the same manner as in Example A1, except that the negative electrode mixture (cA2) was used.

Comparative Example A3

A negative electrode mixture (cA3) for nonaqueous electrolyte secondary batteries was prepared as described in Comparative Example A1, except that the polar group-containing vinylidene fluoride polymer (1) was replaced by the polyvinylidene fluoride.

An electrode (cA3) was produced in the same manner as in Example A1, except that the negative electrode mixture (cA3) was used.

Comparative Example A4

A negative electrode mixture (cA4) for nonaqueous electrolyte secondary batteries was prepared as described in Example A5, except that the polar group-containing vinylidene fluoride polymer (1) was replaced by the polyvinylidene fluoride.

An electrode (cA4) was produced in the same manner as in Example A1, except that the negative electrode mixture (cA4) was used.

Comparative Example A5

10 g of the polar group-containing vinylidene fluoride polymer (2) was homogeneously dissolved in 90 g of N-methyl-2-pyrrolidone to give a binder solution.

To 10 g of the binder solution, 9.0 g of MAG (synthetic graphite manufactured by Hitachi Chemical Co., Ltd., average particle diameter: 20 µm) and 3.22 g of diluent N-methyl-2-pyrrolidone were added. The mixture was stirred and mixed together to give a negative electrode mixture (cA5) for nonaqueous electrolyte secondary batteries.

An electrode (cA5) was produced in the same manner as in Example A1, except that the negative electrode mixture (cA5) was used.

The viscosity of the negative electrode mixture (cA5) for nonaqueous electrolyte secondary batteries was measured with an E-type viscometer at 25° C. and 2 s$^{-1}$ shear rate, resulting in 8600 mPa·s.

Comparative Example A6

An electrode (cA6) was produced in the same manner as in Comparative Example A5, except that the collector was replaced by a 10 µm thick aluminum foil. Aluminum is a collector generally used in positive electrodes of nonaqueous electrolyte secondary batteries.

Comparative Example A7

An electrode (cA7) was produced in the same manner as in Example A5, except that the collector was replaced by a 10 µm thick aluminum foil.

Example B1

10 g of the polar group-containing vinylidene fluoride polymer (2) was homogeneously dissolved in 90 g of N-methyl-2-pyrrolidone to give a binder solution.

To 10 g of the binder solution, 9 g of MAG (synthetic graphite manufactured by Hitachi Chemical Co., Ltd., average particle diameter: 20 µm), 3.186 g of N-methyl-2-pyrrolidone as an electrode mixture viscosity controller, and 0.034 g of a mixture solution of hydrochloric acid and N-methyl-2-pyrrolidone (hydrogen chloride 0.27 wt %, N-methyl-2-pyrrolidone 99.23 wt %, water 0.5 wt %) were added. The mixture was stirred and mixed together to give a negative electrode mixture (B1) for nonaqueous electrolyte secondary batteries.

The negative electrode mixture (B1) for nonaqueous electrolyte secondary batteries was uniformly bar coated on a 10 µm thick rolled copper foil as a collector such that the dry weight of the obtainable mixture layer would be 150 g/m$^2$. The mixture was then dried in a gear oven at 110° C. and was heat treated at 130° C., followed by pressing at 40 MPa. An electrode (B1) was thus produced in which the mixture layer had a bulk density of 1.7 g/cm$^3$.

Example B2

A negative electrode mixture (B2) for nonaqueous electrolyte secondary batteries was prepared as described in Example B1, except that the N-methyl-2-pyrrolidone as an electrode mixture viscosity controller and the hydrochloric acid/N-methyl-2-pyrrolidone mixture solution were used in amounts of 3.119 g and 0.101 g, respectively.

An electrode (B2) was produced in the same manner as in Example B1, except that the negative electrode mixture (B2) was used.

Example B3

A negative electrode mixture (B3) for nonaqueous electrolyte secondary batteries was prepared as described in Example B1, except that the N-methyl-2-pyrrolidone as an electrode mixture viscosity controller and the hydrochloric acid/N-methyl-2-pyrrolidone mixture solution were used in amounts of 3.052 g and 0.168 g, respectively. The viscosity of the negative electrode mixture (B3) for nonaqueous electrolyte secondary batteries was measured with an E-type viscometer at 25° C. and 2 s$^{-1}$ shear rate, resulting in 9500 mPa·s.

An electrode (B3) was produced in the same manner as in Example B1, except that the negative electrode mixture (B3) was used.

Example B4

A negative electrode mixture (B4) for nonaqueous electrolyte secondary batteries was prepared as described in Example B1, except that the N-methyl-2-pyrrolidone as an electrode mixture viscosity controller and the hydrochloric acid/N-methyl-2-pyrrolidone mixture solution were used in amounts of 2.72 g and 0.50 g, respectively.

An electrode (B4) was produced in the same manner as in Example B1, except that the negative electrode mixture (B4) was used.

Example B5

A negative electrode mixture (B5) for nonaqueous electrolyte secondary batteries was prepared as described in Example B1, except that the N-methyl-2-pyrrolidone as an electrode mixture viscosity controller and the hydrochloric acid/N-methyl-2-pyrrolidone mixture solution were used in amounts of 2.22 g and 1.00 g, respectively.

An electrode (B5) was produced in the same manner as in Example B1, except that the negative electrode mixture (B5) was used.

Example B6

A negative electrode mixture (B6) for nonaqueous electrolyte secondary batteries was prepared as described in Example B5, except that the mixture solution of hydrochloric acid and N-methyl-2-pyrrolidone (hydrogen chloride 0.27 wt %, N-methyl-2-pyrrolidone 99.23 wt %, water 0.5 wt %) was replaced by a mixture solution of sulfuric acid and N-methyl-2-pyrrolidone (sulfuric acid 0.27 wt %, N-methyl-2-pyrrolidone 97.3 wt %, water 2.43 wt %).

An electrode (B6) was produced in the same manner as in Example B1, except that the negative electrode mixture (B6) was used.

Example B7

A negative electrode mixture (B7) for nonaqueous electrolyte secondary batteries was prepared as described in Example B3, except that the polar group-containing vinylidene fluoride polymer (2) was replaced by the polar group-containing vinylidene fluoride polymer (3).

An electrode (B7) was produced in the same manner as in Example B1, except that the negative electrode mixture (B7) was used.

Comparative Example B1

10 g of the polar group-containing vinylidene fluoride polymer (2) was homogeneously dissolved in 90 g of N-methyl-2-pyrrolidone to give a binder solution.

To 10 g of the binder solution, 9 g of MAG (synthetic graphite manufactured by Hitachi Chemical Co., Ltd., average particle diameter: 20 μm) and 3.22 g of N-methyl-2-pyrrolidone as an electrode mixture viscosity controller were added. The mixture was stirred and mixed together to give a negative electrode mixture (cB1) for nonaqueous electrolyte secondary batteries. The viscosity of the negative electrode mixture (cB1) for nonaqueous electrolyte secondary batteries was measured with an E-type viscometer at 25° C. and 2 $s^{-1}$ shear rate, resulting in 9500 mPa·s.

The negative electrode mixture (cB1) for nonaqueous electrolyte secondary batteries was uniformly bar coated on a 10 μm thick rolled copper foil as a collector such that the dry weight of the obtainable mixture layer would be 150 g/m². The mixture was then dried in a gear oven at 110° C. and was heat treated at 130° C., followed by pressing at 40 MPa. An electrode (cB1) was thus produced in which the mixture layer had a density of 1.7 g/cm³.

Comparative Example B2

A negative electrode mixture (cB2) for nonaqueous electrolyte secondary batteries was prepared as described in Example B1, except that the N-methyl-2-pyrrolidone as an electrode mixture viscosity controller and the hydrochloric acid/N-methyl-2-pyrrolidone mixture solution were used in amounts of 1.22 g and 2.00 g, respectively.

An electrode (cB2) was produced in the same manner as in Example B1, except that the negative electrode mixture (cB2) was used.

Comparative Example B3

A negative electrode mixture (cB3) for nonaqueous electrolyte secondary batteries was prepared as described in Example B5, except that the mixture solution of hydrochloric acid and N-methyl-2-pyrrolidone (hydrogen chloride 0.27 wt %, N-methyl-2-pyrrolidone 99.23 wt %, water 0.5 wt %) was replaced by a mixture solution of hydrofluoric acid and N-methyl-2-pyrrolidone (hydrogen fluoride 0.27 wt %, N-methyl-2-pyrrolidone 98.85 wt %, water 0.88 wt %).

An electrode (cB3) was produced in the same manner as in Example B1, except that the negative electrode mixture (cB3) was used.

Comparative Example B4

A negative electrode mixture (cB4) for nonaqueous electrolyte secondary batteries was prepared as described in Example B5, except that the mixture solution of hydrochloric acid and N-methyl-2-pyrrolidone (hydrogen chloride 0.27 wt %, N-methyl-2-pyrrolidone 99.23 wt %, water 0.5 wt %) was replaced by a mixture solution of acetic acid and N-methyl-2-pyrrolidone (acetic acid 0.27 wt %, N-methyl-2-pyrrolidone 99.73 wt %).

An electrode (cB4) was produced in the same manner as in Example B1, except that the negative electrode mixture (cB4) was used.

Comparative Example B5

An electrode (cB5) was produced in the same manner as in Comparative Example B1, except that the 10 μm thick rolled copper foil collector was replaced by a 10 μm thick rolled aluminum foil.

Aluminum is a collector generally used in positive electrodes of nonaqueous electrolyte secondary batteries.

Comparative Example B6

An electrode (cB6) was produced in the same manner as in Example B3, except that the 10 μm thick rolled copper foil collector was replaced by a 10 μm thick rolled aluminum foil.

Comparative Example B7

An electrode (cB7) was produced in the same manner as in Example B4, except that the 10 μm thick rolled copper foil collector was replaced by a 10 μm thick rolled aluminum foil.

Comparative Example B8

An electrode (cB8) was produced in the same manner as in Example B5, except that the 10 μm thick rolled copper foil collector was replaced by a 10 μm thick rolled aluminum foil.

Comparative Example B9

An electrode (cB9) was produced in the same manner as in Comparative Example B1, except that the 10 μm thick rolled copper foil collector was replaced by a 10 μm thick rolled nickel foil.

Comparative Example B10

An electrode (cB10) was produced in the same manner as in Example B3, except that the 10 μm thick rolled copper foil collector was replaced by a 10 μm thick rolled nickel foil.

Comparative Example B11

A negative electrode mixture (cB11) for nonaqueous electrolyte secondary batteries was prepared as described in Comparative Example B1, except that the polar group-containing vinylidene fluoride polymer (2) was replaced by the polyvinylidene fluoride.

An electrode (cB11) was produced in the same manner as in Comparative Example B1, except that the negative electrode mixture (cB11) was used.

Comparative Example B12

A negative electrode mixture (cB12) for nonaqueous electrolyte secondary batteries was prepared as described in Example B3, except that the polar group-containing vinylidene fluoride polymer (2) was replaced by the polyvinylidene fluoride.

An electrode (cB12) was produced in the same manner as in Example B3, except that the negative electrode mixture (cB12) was used.

Properties of the electrodes obtained using the negative electrode mixtures in Examples and Comparative Examples were evaluated as described below. Batteries were manufactured using the electrodes as described below, and properties of the batteries were evaluated.

[Peel Strength]

The electrodes in Examples and Comparative Examples were tested by a 180° peel test in accordance with JIS K6854 to determine the peel strength between the collector and the mixture layer. The results are set forth in Tables 1 and 3.

[Battery Performance Test]
(Preparation of Positive Electrodes)

18.8 g of lithium cobaltate (CELLSEED C5H manufactured by Nippon Chemical Industrial Co., LTD.), 0.6 g of carbon black (DENKA BLACK manufactured by DENKI KAGAKU KOGYO KABUSHIKI KAISHA.) and 3.75 g of diluent N-methyl-2-pyrrolidone were added to 5 g of an N-methylpyrrolidone (NMP) solution of polyvinylidene fluoride (KF Polymer L No. 1320 manufactured by KUREHA CORPORATION, resin concentration 12 wt %). The mixture was stirred and mixed together with THINKY MIXER (manufactured by THINKY CORPORATION) to give a positive electrode mixture for nonaqueous electrolyte secondary batteries. The positive electrode mixture for nonaqueous electrolyte secondary batteries was uniformly bar coated on a 50 μm thick aluminum foil as a collector such that the dry weight of the obtainable mixture layer would be 210 g/m². The mixture was then dried in a gear oven at 130° C. and was pressed at 500 MPa. A positive electrode for nonaqueous electrolyte secondary batteries was thus produced in which the mixture layer had a bulk density of 3.6 g/cm³.

(Cycle Test)

The negative electrodes obtained in Examples and Comparative Examples were punched out to a diameter of 15 mm, and the positive electrodes were punched out to a diameter of 14 mm. They were assembled via a glass filter separator (GA-55 manufactured by ADVANTEC) with the respective mixture layers opposed to each other. The assemblies were each placed in a stainless steel case having a polypropylene packing. To the cases was injected an electrolyte which had been prepared by adding 1.5 mol/L LiPF$_6$ to a 1:2:2 by volume solution of ethylene carbonate, dimethyl carbonate and methylethyl carbonate. The cases were then closed with a 0.2 mm thick stainless steel lid, and thereby the contents were sealed. Coin batteries A with a diameter of 20 mm and a thickness of 3.2 mm were thus manufactured.

The batteries A were charged to 4.2 V at a constant current of 5.0 mA in a thermostatic chamber at 25° C. The charging was continued until the voltage became constant and the current attenuated to 50 μA. Thereafter, the batteries were discharged to 3.0 V at a constant current of 5.0 mA. The recharging and discharging were repeated. The discharge capacity at the 100th discharging was expressed in percentage relative to the discharge capacity at the first discharging. The capacity maintenance ratio (%) after 100 cycles is shown in Tables 2 and 4.

TABLE 1

| | Inorganic salt | Amount[*1] of inorganic salt [ppm] | Collector | Peel strength [gf/mm] |
|---|---|---|---|---|
| Ex. A1 | LiCl | 64 | Cu | 3.6 |
| Ex. A2 | LiCl | 128 | Cu | 4.8 |
| Ex. A3 | KCl | 64 | Cu | 4.6 |
| Ex. A4 | KBr | 64 | Cu | 3.7 |
| Ex. A5 | KCl | 111 | Cu | 5.7 |
| Comp. Ex. A1 | — | 0 | Cu | 2.7 |
| Comp. Ex. A2 | LiCl | 957 | Cu | 2.5 |
| Comp. Ex. A3 | — | 0 | Cu | 2.9 |
| Comp. Ex. A4 | KCl | 111 | Cu | 2.9 |
| Comp. Ex. A5 | — | 0 | Cu | 3.4 |
| Comp. Ex. A6 | — | 0 | Al | 4.0 |
| Comp. Ex. A7 | KCl | 111 | Al | 4.2 |

[*1]Based on 100 wt % of active material

TABLE 2

| Negative electrode | Capacity maintenance ratio after 100 cycles [%] |
|---|---|
| Example A3 | 96.9 |
| Comparative Example A1 | 96.9 |

TABLE 3

| | Polymer | Inorganic acid | Amount[*3] of acid [ppm] | Collector | Peel strength [gf/mm] |
|---|---|---|---|---|---|
| Ex. B1 | Polymer (2)[*1] | HCl | 10 | Cu | 4.0 |
| Ex. B2 | Polymer (2)[*1] | HCl | 30 | Cu | 4.9 |
| Ex. B3 | Polymer (2)[*1] | HCl | 50 | Cu | 5.7 |
| Ex. B4 | Polymer (2)[*1] | HCl | 150 | Cu | 5.1 |
| Ex. B5 | Polymer (2)[*1] | HCl | 300 | Cu | 5.5 |
| Ex. B6 | Polymer (2)[*1] | Sulfuric acid | 300 | Cu | 6.7 |
| Ex. B7 | Polymer (3)[*2] | HCl | 50 | Cu | 16.4 |
| Comp. Ex. B1 | Polymer (2)[*1] | — | 0 | Cu | 3.4 |
| Comp. Ex. B2 | Polymer (2)[*1] | HCl | 600 | Cu | 2.9 |
| Comp. Ex. B3 | Polymer (2)[*1] | HF | 300 | Cu | 2.9 |
| Comp. Ex. B4 | Polymer (2)[*1] | Acetic acid | 300 | Cu | 3.8 |
| Comp. Ex. B5 | Polymer (2)[*1] | — | 0 | Al | 4.0 |
| Comp. Ex. B6 | Polymer (2)[*1] | HCl | 50 | Al | 4.0 |
| Comp. Ex. B7 | Polymer (2)[*1] | HCl | 150 | Al | 4.0 |
| Comp. Ex. B8 | Polymer (2)[*1] | HCl | 300 | Al | 4.0 |
| Comp. Ex. B9 | Polymer (2)[*1] | — | 0 | Ni | 0.8 |
| Comp. Ex. B10 | Polymer (2)[*1] | HCl | 50 | Ni | 0.7 |

TABLE 3-continued

| | Polymer | Inorganic acid | Amount*[3] of acid [ppm] | Collector | Peel strength [gf/mm] |
|---|---|---|---|---|---|
| Comp. Ex. B11 | Polyvinylidene fluoride | — | 0 | Cu | 2.9 |
| Comp. Ex. B12 | Polyvinylidene fluoride | HCl | 50 | Cu | 2.8 |

*[1]Carboxyl group-containing vinylidene fluoride polymer (2)
*[2]Carboxyl group-containing vinylidene fluoride polymer (3)
*[3]Based on 100 wt % of active material

TABLE 4

| Negative electrode | Capacity maintenance ratio after 100 cycles [%] |
|---|---|
| Example B3 | 96.9 |
| Comparative Example B1 | 96.9 |

The results in Tables 1 and 3 show that the electrodes manufactured by applying the negative electrode mixtures of the invention on the collectors achieved excellent peel strength between the mixture layer and the collector. Further, from Tables 2 and 4, the negative electrodes for nonaqueous electrolyte secondary batteries produced with the negative electrode mixtures of the invention were comparable in performance to the conventional negative electrodes.

The invention claimed is:

1. A negative electrode mixture for nonaqueous electrolyte secondary batteries which comprises an inorganic salt represented by Formula (A) below, an electrode active material, a polar group-containing vinylidene fluoride polymer and an organic solvent,
the inorganic salt being contained at 10 to 500 ppm based on 100 wt % of the electrode active material;

MX ... (A)

wherein M is an alkali metal, and X is Cl or Br.

2. The negative electrode mixture for nonaqueous electrolyte secondary batteries according to claim 1, wherein the inorganic salt is at least one selected from the group consisting of potassium chloride and lithium chloride.

3. The negative electrode mixture for nonaqueous electrolyte secondary batteries according to claim 1, wherein the polar group-containing vinylidene fluoride polymer is a vinylidene fluoride copolymer obtained by copolymerizing 80 to 99.9 parts by weight of vinylidene fluoride and 0.1 to 20 parts by weight of a polar group-containing monomer (wherein the total of the vinylidene fluoride and the polar group-containing monomer is 100 parts by weight).

4. The negative electrode mixture for nonaqueous electrolyte secondary batteries according to claim 1, wherein the polar group-containing vinylidene fluoride polymer is a vinylidene fluoride polymer which has at least one polar group selected from the group consisting of carboxyl groups and carboxylic acid anhydride groups.

5. The negative electrode mixture for nonaqueous electrolyte secondary batteries according to claim 4, wherein the polar group-containing vinylidene fluoride polymer has an infrared absorption spectrum in which the absorbance ratio ($I_R$) represented by Formula (1) below is in the range of 0.1 to 1.5;

$$I_R = I_{1750}/I_{3025} \quad (1)$$

wherein $I_{1750}$ is the absorbance at 1750 cm$^{-1}$ and $I_{3025}$ is the absorbance at 3025 cm$^{-1}$.

6. The negative electrode mixture for nonaqueous electrolyte secondary batteries according to claim 1, wherein the electrode active material is a carbon material.

7. A negative electrode for nonaqueous electrolyte secondary batteries which is obtainable by applying the negative electrode mixture for nonaqueous electrolyte secondary batteries of claim 1, on a collector and drying the mixture.

8. The negative electrode for nonaqueous electrolyte secondary batteries according to claim 7, wherein the collector is a copper foil.

9. A nonaqueous electrolyte secondary battery which comprises the negative electrode for nonaqueous electrolyte secondary batteries of claim 7.

10. The negative electrode mixture for nonaqueous electrolyte secondary batteries according to claim 2, wherein the polar group-containing vinylidene fluoride polymer is a vinylidene fluoride copolymer obtained by copolymerizing 80 to 99.9 parts by weight of vinylidene fluoride and 0.1 to 20 parts by weight of a polar group-containing monomer (wherein the total of the vinylidene fluoride and the polar group-containing monomer is 100 parts by weight).

11. The negative electrode mixture for nonaqueous electrolyte secondary batteries according to claim 2, wherein the polar group-containing vinylidene fluoride polymer is a vinylidene fluoride polymer which has at least one polar group selected from the group consisting of carboxyl groups and carboxylic acid anhydride groups.

12. The negative electrode mixture for nonaqueous electrolyte secondary batteries according to claim 3, wherein the polar group-containing vinylidene fluoride polymer is a vinylidene fluoride polymer which has at least one polar group selected from the group consisting of carboxyl groups and carboxylic acid anhydride groups.

13. The negative electrode mixture for nonaqueous electrolyte secondary batteries according to claim 5, wherein the electrode active material is a carbon material.

14. A negative electrode for nonaqueous electrolyte secondary batteries which is obtainable by applying the negative electrode mixture for nonaqueous electrolyte secondary batteries of claim 5, on a collector and drying the mixture.

15. A negative electrode for nonaqueous electrolyte secondary batteries which is obtainable by applying the negative electrode mixture for nonaqueous electrolyte secondary batteries of claim 6, on a collector and drying the mixture.

16. A nonaqueous electrolyte secondary battery which comprises the negative electrode for nonaqueous electrolyte secondary batteries of claim 8.

* * * * *